(12) United States Patent
Voelz et al.

(10) Patent No.: US 10,815,638 B2
(45) Date of Patent: Oct. 27, 2020

(54) LINER SYSTEM FOR A DIPPER

(71) Applicant: Harnischfeger Technologies, Inc., Wilmington, DE (US)

(72) Inventors: Nicholas R. Voelz, West Allis, WI (US); Richard Nicoson, Hartford, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 408 days.

(21) Appl. No.: 14/513,309

(22) Filed: Oct. 14, 2014

(65) Prior Publication Data

US 2015/0110592 A1 Apr. 23, 2015

Related U.S. Application Data

(60) Provisional application No. 61/892,261, filed on Oct. 17, 2013.

(51) Int. Cl.
*E02F 3/40* (2006.01)
*E02F 3/60* (2006.01)
(Continued)

(52) U.S. Cl.
CPC ............... *E02F 3/40* (2013.01); *B23K 31/02* (2013.01); *E02F 3/60* (2013.01); *E02F 9/2883* (2013.01);
(Continued)

(58) Field of Classification Search
CPC ....... E02F 3/40; E02F 3/60; E02F 9/00; E02F 9/285; E02F 9/2858; E02F 3/47;
(Continued)

(56) References Cited

U.S. PATENT DOCUMENTS 2,020,373 A * 11/1935 Petzold, Jr. ............ A21B 3/133
220/533
2,077,749 A * 4/1937 Fischer ................... E01C 11/24
404/21
(Continued)

FOREIGN PATENT DOCUMENTS

DE 102011053098 A1 * 2/2013
EP 1897755 A2 3/2008
(Continued)

OTHER PUBLICATIONS

International Search Report and Written Opinion for PCT Application No. PCT/US2014/060346 dated Jan. 19, 2015 (13 pages).
(Continued)

*Primary Examiner* — Brian D Mattei
*Assistant Examiner* — Charissa Ahmad
(74) *Attorney, Agent, or Firm* — Michael Best & Friedrich LLP

(57) ABSTRACT

A mining machine includes a boom, a handle coupled to the boom, and a dipper coupled to the handle. The mining machine further includes a liner system coupled to the dipper. The liner system includes a first guide member and a second guide member coupled to a surface of the dipper, wherein the first and second guide members and the surface of the dipper define a channel extending along the dipper, and wherein the liner system further includes an insert disposed at least partially within the channel that is inhibited from moving away from the surface of the dipper by a portion of the first guide member.

20 Claims, 4 Drawing Sheets

(51) Int. Cl.
  *B23K 31/02* (2006.01)
  *E02F 9/28* (2006.01)
  *E21C 47/00* (2006.01)
(52) U.S. Cl.
  CPC .......... *E21C 47/00* (2013.01); *Y10T 29/49826* (2015.01)
(58) Field of Classification Search
  CPC ....... E02F 3/304; E02F 9/2883; E02F 3/8157; E02F 3/401; Y10S 37/903; B60R 13/07; B60P 1/286; B60P 1/283; B02C 17/22; B02C 17/225
  USPC ............................................. 414/722; 37/444
  See application file for complete search history.

(56) References Cited

U.S. PATENT DOCUMENTS

| | | | | |
|---|---|---|---|---|
| 2,181,812 A | * | 11/1939 | Kammerer | E06B 1/70 428/52 |
| 2,392,789 A | * | 1/1946 | Watter | B64C 1/20 105/422 |
| 2,678,139 A | | 5/1954 | Gildersleeve | |
| 3,163,304 A | * | 12/1964 | Kohorst | E02F 3/3405 414/704 |
| 3,200,983 A | * | 8/1965 | Walter | A47B 88/90 217/7 |
| 3,363,933 A | * | 1/1968 | Wilson | B60P 1/286 105/261.2 |
| 3,578,375 A | * | 5/1971 | Finefrock | B60R 13/01 105/422 |
| 3,851,413 A | * | 12/1974 | Lukavich | E02F 9/2816 37/450 |
| 3,942,239 A | * | 3/1976 | Johansson | B60P 1/286 105/423 |
| 3,958,830 A | | 5/1976 | Johns | |
| 4,029,354 A | * | 6/1977 | Valeri | B60P 1/286 105/423 |
| 4,129,952 A | | 12/1978 | Olson | |
| 4,165,041 A | * | 8/1979 | Larsen | B02C 17/22 241/182 |
| 4,320,589 A | * | 3/1982 | Pelazza | E01H 5/063 172/12 |
| 4,324,525 A | * | 4/1982 | Lane | E02F 3/3417 414/699 |
| 4,395,193 A | * | 7/1983 | Christensen | E02F 3/401 37/444 |
| 4,420,370 A | * | 12/1983 | Saad | D21F 1/009 162/209 |
| 4,436,215 A | * | 3/1984 | Kleinert | B65D 25/06 220/533 |
| 4,523,397 A | * | 6/1985 | Lucas | E02F 3/401 37/444 |
| 4,547,985 A | * | 10/1985 | Silins | B23K 35/0288 172/701.1 |
| 4,944,544 A | * | 7/1990 | Dick | B60R 7/02 224/542 |
| 4,962,598 A | * | 10/1990 | Woolhiser | E01H 1/056 172/819 |
| 5,029,628 A | * | 7/1991 | Lemay | E06B 9/386 160/166.1 |
| 5,044,682 A | * | 9/1991 | Wayne | B60R 13/01 296/39.2 |
| 5,055,336 A | * | 10/1991 | Davis | B65G 11/166 193/2 R |
| 5,088,214 A | * | 2/1992 | Jones | E02F 9/2883 172/772.5 |
| 5,094,375 A | * | 3/1992 | Wright | B60R 7/02 224/404 |
| 5,259,712 A | * | 11/1993 | Wayne | B60R 13/01 410/129 |
| D345,050 S | * | 3/1994 | Ryan | D12/221 |
| D357,260 S | * | 4/1995 | Kallen | D15/32 |
| 5,469,647 A | | 11/1995 | Profio | |
| 5,785,456 A | | 7/1998 | McAlpine | |
| 5,795,006 A | * | 8/1998 | Beckstrom | B60R 13/01 296/39.2 |
| 5,803,531 A | * | 9/1998 | Nielsen | B60R 13/01 105/422 |
| 5,901,480 A | * | 5/1999 | Shamblin | E02F 3/40 37/404 |
| 6,312,034 B1 | | 11/2001 | Coleman, II et al. | |
| 6,520,590 B2 | * | 2/2003 | Feuereisen Azocar | B60P 1/286 296/183.2 |
| 6,565,146 B2 | * | 5/2003 | Fujan | B60P 1/286 296/183.2 |
| 6,619,717 B2 | | 9/2003 | Gardiner | |
| 6,682,118 B2 | | 1/2004 | Ryan | |
| 6,799,385 B2 | * | 10/2004 | Champney | B23K 35/0288 172/701.3 |
| 6,935,678 B1 | * | 8/2005 | Laban | B60P 1/286 296/183.1 |
| 7,025,407 B2 | * | 4/2006 | Medel | B60P 1/283 296/181.3 |
| 7,207,621 B2 | * | 4/2007 | D'Amico | B62D 33/02 296/183.1 |
| 7,429,158 B2 | * | 9/2008 | McFarland | E02F 3/401 37/274 |
| 7,434,868 B2 | * | 10/2008 | D'Amico | B62D 33/02 296/183.1 |
| 7,481,483 B2 | * | 1/2009 | D'Amico | B60P 1/286 296/183.1 |
| 7,918,969 B2 | * | 4/2011 | McPherson | D21F 1/483 162/199 |
| 8,016,220 B2 | * | 9/2011 | Melo | B02C 17/22 241/183 |
| 8,052,193 B2 | * | 11/2011 | Liebert | B60R 13/01 296/183.1 |
| 8,136,649 B2 | * | 3/2012 | Burstrom | B02C 17/225 193/2 R |
| 8,141,928 B2 | * | 3/2012 | Zamorano Jones | B61D 7/00 296/182.1 |
| 8,312,650 B2 | | 11/2012 | McClanahan et al. | |
| 8,360,494 B2 | | 1/2013 | Quiros Perez | |
| 8,458,931 B2 | | 6/2013 | Knight | |
| 8,622,330 B2 | * | 1/2014 | Mepham | B02C 17/225 241/182 |
| 8,635,754 B2 | * | 1/2014 | Hagenbuch | B62D 25/20 29/402.08 |
| 9,279,231 B2 | * | 3/2016 | Bienfang | E02F 3/40 |
| 9,464,445 B2 | * | 10/2016 | Ben-Ezri | E04F 15/02166 |
| 2005/0126056 A1 | * | 6/2005 | Kostecki | B60P 1/286 37/379 |
| 2009/0015028 A1 | * | 1/2009 | Zamorano Jones | B61D 7/00 296/39.2 |
| 2009/0193810 A1 | * | 8/2009 | Gerendas | F23R 3/002 60/753 |
| 2011/0129638 A1 | | 6/2011 | Harder et al. | |
| 2013/0145660 A1 | | 6/2013 | Zamorano Jones | |
| 2013/0192101 A1 | * | 8/2013 | Gilmore | E02F 9/006 37/445 |
| 2014/0015279 A1 | * | 1/2014 | De Paula e Silva | B60P 1/286 296/183.2 |
| 2015/0191899 A1 | * | 7/2015 | Jones | E02F 3/40 37/444 |
| 2016/0161121 A1 | * | 6/2016 | Chang | C04B 35/80 60/753 |

FOREIGN PATENT DOCUMENTS

| | | | |
|---|---|---|---|
| JP | 06099299 A | * | 4/1994 |
| JP | H11081364 A | | 3/1999 |
| JP | 3057732 U | | 6/1999 |
| JP | 2000192496 A | * | 7/2000 |
| JP | 2002201659 A | | 7/2002 |

(56) References Cited

FOREIGN PATENT DOCUMENTS

| | | | | |
|---|---|---|---|---|
| JP | 2009179958 | A | * | 8/2009 |
| JP | 2014125316 | A | * | 7/2014 |
| RU | 2040341 | C1 | * | 7/1995 |

OTHER PUBLICATIONS

First Office Action from the State Intellectual Property Office of China for Application No. 201480064777.2 dated May 10, 2017 (8 pages, which includes a Statement of Relevance).
"Defender Chocky Bars", Raptor Wear Parts website, http://www.raptorwearparts.com/product.php?id=37, 2 pages, Sep. 23, 2013, Edmonton, Alberta, Canada.

* cited by examiner

LINER SYSTEM FOR A DIPPER

CROSS-REFERENCE TO RELATED APPLICATIONS

This application claims priority to U.S. Provisional Application No. 61/892,261, filed Oct. 17, 2013, the entire contents of which are incorporated herein by reference.

FIELD OF THE INVENTION

The present invention relates to the field of mining machines. Specifically, the present invention relates to a liner system for a dipper.

Industrial mining machines, such as electric rope or power shovels, draglines, etc., are used to execute digging operations to remove material from a bank of a mine. On a conventional rope shovel, a dipper is attached to a handle, and the dipper is supported by a cable, or rope, that passes over a boom sheave. The rope is secured to a bail that is pivotably coupled to the dipper. The handle is moved along a saddle block to maneuver a position of the dipper. During a hoist phase, the rope is reeled in by a winch in a base of the machine, lifting the dipper upward through the bank and liberating the material to be dug. This movement of the dipper through the material generates wear on one or more surfaces of the dipper.

SUMMARY

In accordance with one construction, a mining machine includes a boom, a handle coupled to the boom, and a dipper coupled to the handle. The mining machine further includes a liner system coupled to the dipper. The liner system includes a first guide member and a second guide member coupled to a surface of the dipper, wherein the first and second guide members and the surface of the dipper define a channel extending along the dipper, and wherein the liner system further includes an insert disposed at least partially within the channel that is inhibited from moving away from the surface of the dipper by a portion of the first guide member.

In accordance with another construction, a method of assembling a liner system to a dipper of a mining machine includes coupling both a first guide member and a second guide member to a surface of the dipper. The first and second guide members and the surface of the dipper define a channel along the dipper. The method also includes sliding an insert between the first and second guide members, such that the insert is at least partially disposed within the channel.

In accordance with another construction, a liner system for a dipper on a mining machine includes a plurality of guide members coupled to a surface of the dipper, the guide members spaced apart such that a channel is formed between adjacent guide members. The liner system also includes a plurality of inserts, each insert sized to fit within one of the channels such that the inserts are inhibited from moving away from the surface of the dipper by the guide members when the inserts are disposed at least partially in the channel.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
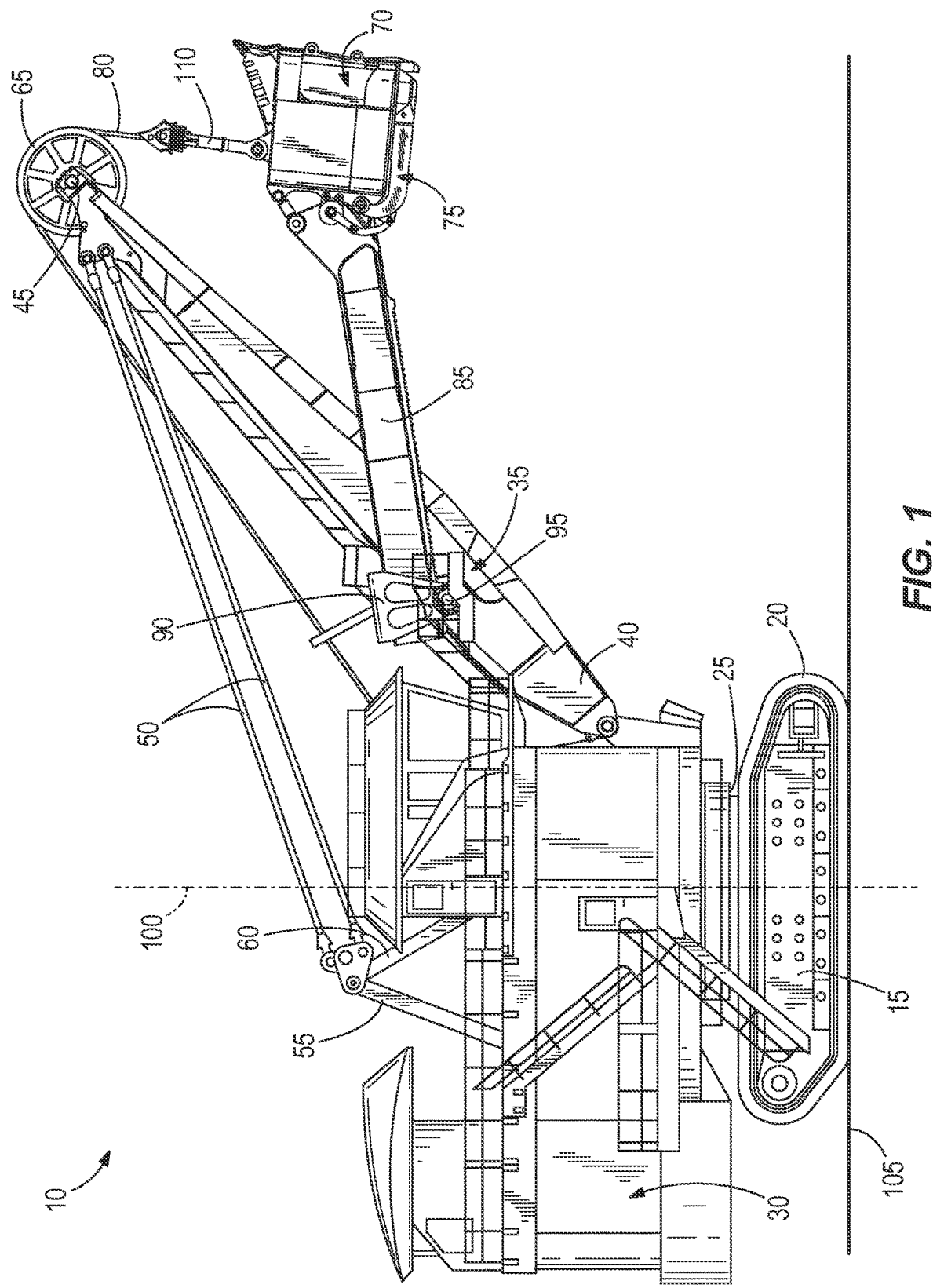
FIG. 1 is a perspective view of a mining shovel.

FIG. 1 illustrates a power shovel 10. The shovel 10 includes a mobile base 15, drive tracks 20, a turntable 25, a revolving frame 30, a boom 35, a lower end 40 of the boom 35 (also called a boom foot), an upper end 45 of the boom 35 (also called a boom point), tension cables 50, a gantry tension member 55, a gantry compression member 60, a sheave 65 rotatably mounted on the upper end 45 of the boom 35, a dipper 70, a dipper door 75 pivotally coupled to the dipper 70, a hoist rope 80, a winch drum (not shown), a dipper handle 85, a saddle block 90, a shipper shaft 95, and a transmission unit (also called a crowd drive, not shown). The rotational structure 25 allows rotation of the upper frame 30 relative to the lower base 15. The turntable 25 defines a rotational axis 100 of the shovel 10. The rotational axis 100 is perpendicular to a plane 105 defined by the base 15 and generally corresponds to a grade of the ground or support surface.

The mobile base 15 is supported by the drive tracks 20. The mobile base 15 supports the turntable 25 and the revolving frame 30. The turntable 25 is capable of 360-degrees of rotation relative to the mobile base 15. The boom 35 is pivotally connected at the lower end 40 to the revolving frame 30. The boom 35 is held in an upwardly and outwardly extending relation to the revolving frame 30 by the tension cables 50, which are anchored to the gantry tension member 55 and the gantry compression member 60. The gantry compression member 60 is mounted on the revolving frame 30.

The dipper 70 is suspended from the boom 35 by the hoist rope 80. The hoist rope 80 is wrapped over the sheave 65 and attached to the dipper 70 at a bail 110. The hoist rope 80 is anchored to the winch drum (not shown) of the revolving frame 30. The winch drum is driven by at least one electric motor (not shown) that incorporates a transmission unit (not shown). As the winch drum rotates, the hoist rope 80 is paid out to lower the dipper 70 or pulled in to raise the dipper 70. The dipper handle 85 is also coupled to the dipper 70. The dipper handle 85 is slidably supported in the saddle block 90, and the saddle block 90 is pivotally mounted to the boom 35 at the shipper shaft 95. The dipper handle 85 includes a rack and tooth formation thereon that engages a drive pinion (not shown) mounted in the saddle block 90. The drive pinion is driven by an electric motor and transmission unit (not shown) to extend or retract the dipper handle 85 relative to the saddle block 90.

An electrical power source (not shown) is mounted to the revolving frame 30 to provide power to a hoist electric motor (not shown) for driving the hoist drum, one or more crowd electric motors (not shown) for driving the crowd transmission unit, and one or more swing electric motors (not shown) for turning the turntable 25. Each of the crowd, hoist, and swing motors is driven by its own motor controller, or is alternatively driven in response to control signals from a controller (not shown).

Figure 2:
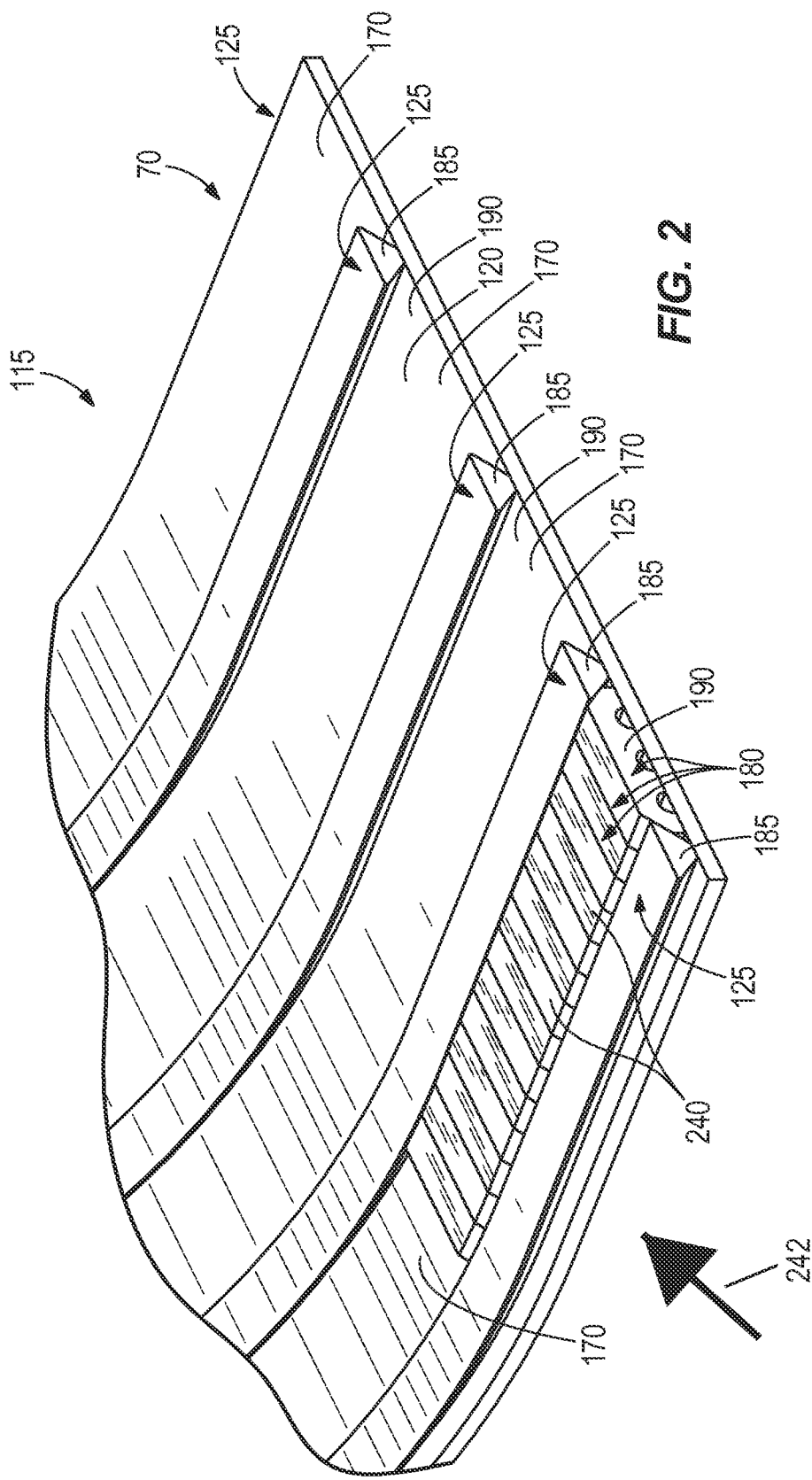
FIG. 2 is a partial view of a dipper of the mining shovel, illustrating a liner system according to one construction of the invention.
Figure 3:
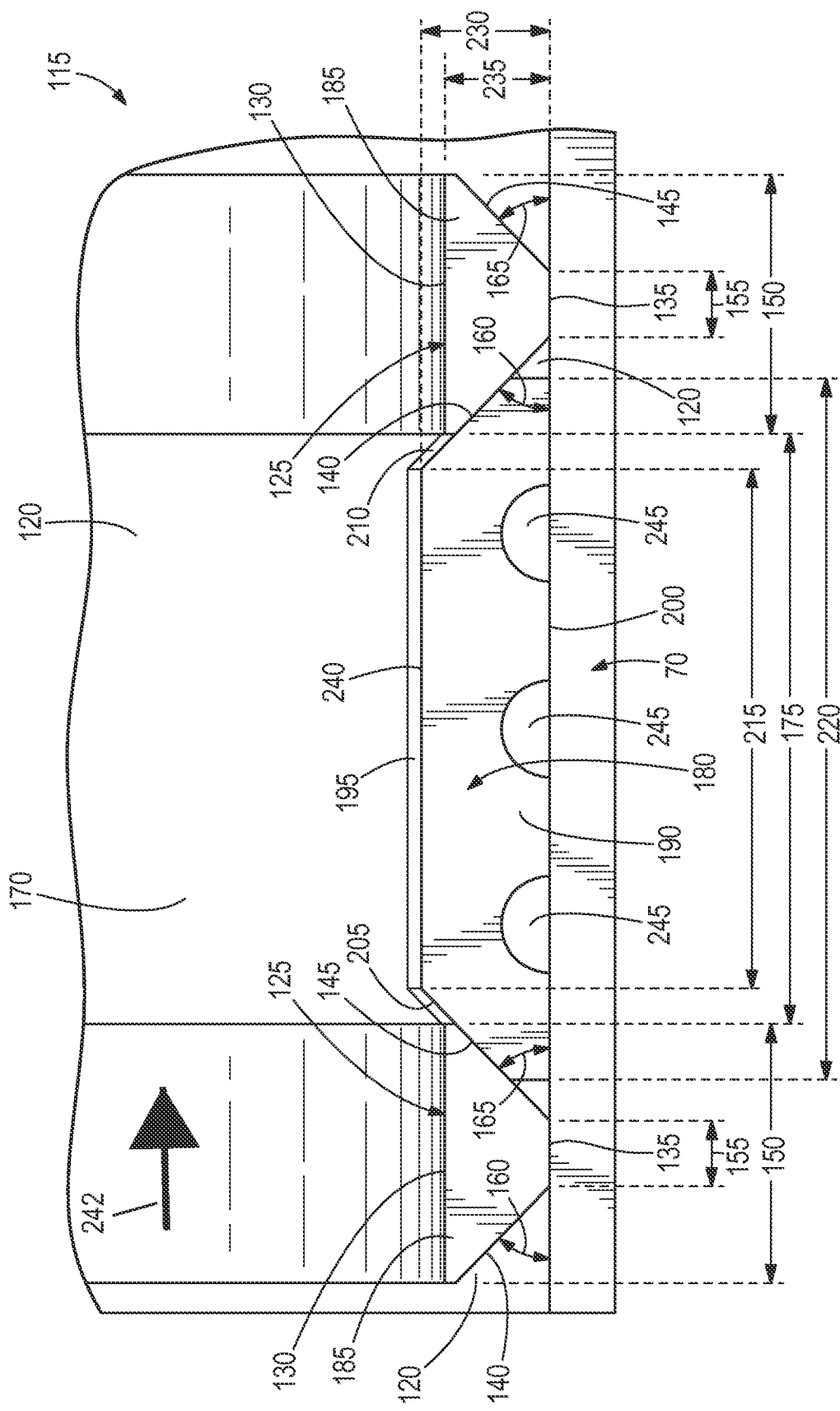
FIG. 3 is an enlarged view of a portion of the liner system, illustrating a single insert disposed within a channel in the liner system.

FIGS. 2 and 3 illustrate a liner system 115 for the dipper 70. The liner system 115 protects the dipper from wear and damage as the dipper 70 is swung through a bank of material to pick up material, and as abrasive elements (e.g., bits of ore and rocks) in the material scrape against the dipper 70. The liner system 115 is coupled to a surface 120 (e.g., an inner surface) of the dipper 70. The surface 120 may be any surface of the dipper 70 exposed to abrasive material during use.

With reference to FIGS. 2 and 3, the liner system 115 includes guide members 125 coupled to the surface 120. For example, in some constructions the guide members 125 are separate components welded to the surface 120, while in other constructions the guide members 125 are integrally formed with the surface 120. In some constructions the guide members 125 are fastened to the surface 120. The guide members 125 are elongate, metallic (e.g., steel) structures arranged generally parallel to one another along the surface 120, and are spaced generally evenly apart from one another. As illustrated in FIG. 3, the guide members 125 each have a generally trapezoidal cross-sectional shape defined by a first surface 130, a second surface 135 disposed opposite the first surface, a third surface 140 extending between the first and second surfaces 130, 135, and a fourth surface 145 extending between the first and second surfaces 130, 135. The first surface 130 extends generally parallel to the surface 120, as well as to the second surface 135. The first surface 130 has a width 150 greater than a width 155 of the second surface 135. The second surface 135, along with the areas of intersection of surfaces 140 and 145 with the second surface 135, are coupled (e.g., welded) to the surface 120.

The third surface 140 extends between the first surface 130 and the second surface 135 at an acute angle 160 relative to the surface 120. The fourth surface 145 extends between the first surface 130 and the second surface 135 at an acute angle 165 relative to the surface 120. The acute angles 160, 165 are equal to one another, and as illustrated in FIGS. 2 and 3, the third surface 140 and the fourth surface 145 converge toward the surface 120. In some constructions the acute angles 160, 165 are not equal to one another.

With continued reference to FIGS. 2 and 3, the guide members 125 and the surface 120 define channels 170 along the dipper 70. Specifically, and with reference to FIG. 3, the angled fourth surface 145 of one guide member 125, the angled third surface 140 of another guide member 125, and the surface 120 form a channel 170 that extends parallel to and runs between two of the guide members 125. As illustrated in FIG. 3, each channel 170 has a width 175 (represented by a distance between two first surfaces 130 in the illustrated construction) defining a narrowest portion of the channel 170.

With continued reference to FIGS. 2 and 3, the liner system 115 also includes inserts 180. The inserts 180 are non-metallic (e.g., wear-resistant polymer, ceramic) inserts that are removably coupled to the guide members 125 and to the dipper 70. The inserts 180 are arranged in rows within the channels 170. The inserts 180 are modular, such that any one insert 180 may be replaced by another identical insert 180.

Each of the guide members 125 includes an end 185. The ends 185 define at least one access opening 190 into the channel 170 between the two guide members 125. The inserts 180 are coupled to the guide members 125 and to the dipper 70 by sliding the inserts 180 into the access opening 190 and then continuing to slide the inserts 180 along the channel 170.

As illustrated in FIGS. 2 and 3, the inserts 180 are generally retained by the guide members 125 while in the channels 170, and inhibited from moving away from the surface 120. Specifically, and with reference to FIG. 3, each of the inserts 180 has a first surface 195, a second surface 200 disposed opposite the first surface, a third surface 205 extending between the first and second surfaces 195, 200, and a fourth surface 210 extending between the first and second surfaces 195, 200. The first surface 195 has a width 215 that is smaller than a width 220 of the second surface 200, and also smaller than the width 175 of the channel 170. A height 230 between the first surface 195 and the second surface 200 is greater than a height 235 of the guide members 125, such that the first surface 195 and portions of the third and fourth surfaces 205, 210 are exposed above the guide members 125.

The third and fourth surfaces 205, 210 are tapered at angles relative to the first surface 195 such that the third and fourth surfaces 205, 210 diverge away from the first surface 195. The third and fourth surfaces 205, 210 are angled relative to the surface 120 at the same acute angles 165, 160, respectively, as that of the fourth and third surfaces 145, 140, such that the third surface 140 extends parallel to the fourth surface 210, and the fourth surface 145 extends parallel to the third surface 205.

As illustrated in FIG. 3, the fourth surface 145 and the third surface 205 overlap with one another and are adjacent to one another (e.g., contact and slide along one another) along at least a portion of each of the fourth surface 145 and the third surface 205. Similarly, the third surface 140 and the fourth surface 210 overlap with one another and are adjacent to one another (e.g., contact and slide along one another) along at least a portion of each of the third surface 140 and the fourth surface 210.

Because the inserts 180 have at least one width 220 greater than the most narrow width 175 of the channel, and because the surfaces 145, 205 overlap with one another and the surfaces 140, 210 also overlap with one another, the inserts 180 are retained in the channel 170 and are prevented from being pulled away from the channel 170. The inserts 180 are moveable generally only by sliding the inserts 180 along the channel 170, and are removable from the channel 170 generally only by sliding the inserts 180 out of the access opening 190.

Other constructions of the guide members 125 and the inserts 180 include different shapes than that illustrated. For example, in some constructions the guide members 125 are T-shaped, and the inserts 180 are rectangular. In some constructions the inserts 180 have a first surface 195 or a second surface 200 that is curved, to more closely approximate a curved surface 120.

With continued reference to FIGS. 2 and 3, numerous inserts 180 may be inserted into any one channel 170. In some constructions, each of the channels 170 is filled entirely with inserts 180. In some constructions, only portions of one or more channels 170 are filled with inserts 180. The inserts 180 are arranged next to one another, and are in contact with one another, such that the first surfaces 195, along with portions of the third and fourth surfaces 205, 210, rise above the guide members 125 and form a wear region or regions 240. The wear regions 240, along with the guide members 125, absorb the impact and wear of abrasive material passing over the dipper 70 (see arrows 242 in FIGS. 2 and 3 representing movement of material). As the guide members 125 and the wear regions 240 wear down, the inserts 180 advantageously still remain confined within the channels 170.

In some constructions adhesive or expanding foam is applied to the inserts 180 and/or to the channels 170 before the inserts 180 are inserted into the channels 170. Once the inserts 180 are positioned as desired, the adhesive or foam takes hold and fastens the inserts 180 in place within the channels 170.

As illustrated in FIGS. 2 and 3, each of the inserts 180 also includes openings 245. The openings 245 help to reduce the overall weight of the inserts 180. Other constructions do not include openings. One advantage of using low-density, or low-weight inserts 180 is that the dipper 70 is not substantially weighed down and affected by the liner system 115. For example, because of the relatively low weight added by the liner system 115, a cutting force of the dipper 70, as well as a rated capacity of the shovel 10, are not significantly affected by adding the liner system 115. Additionally, because the inserts 180 are light-weight and are modular in nature, the overall weight of the liner system 115 may be adjusted and tuned according to specific needs.

With continued reference to FIGS. 2 and 3, if damage occurs to one or more inserts 180, the overall liner system 115 still remains operational. Specifically, in the event that one of the inserts 180 becomes damaged (e.g., is broken, disintegrated, etc.), the liner system 115 may rely on the remaining inserts 180 to absorb the wear on the dipper 70. The space taken by a disintegrated insert 180 may be packed with dirt, allowing the liner system 115 to still function effectively. If the inserts 180 are not adhered or attached in place, a new insert 180 may be added by inserting an insert 180 into the access opening 190 and pushing a row of inserts 180 down one of the channels 170 to make room for the new insert 180. Additionally, if the inserts 180 are made of polymer, the inserts 180 will have a relatively low coefficient of friction as compared with non-polymer inserts 180, which will advantageously lessen the amount of material being carried back with each dig cycle during conditions where wet or sticky material is being excavated by the shovel 10.

Figure 4:
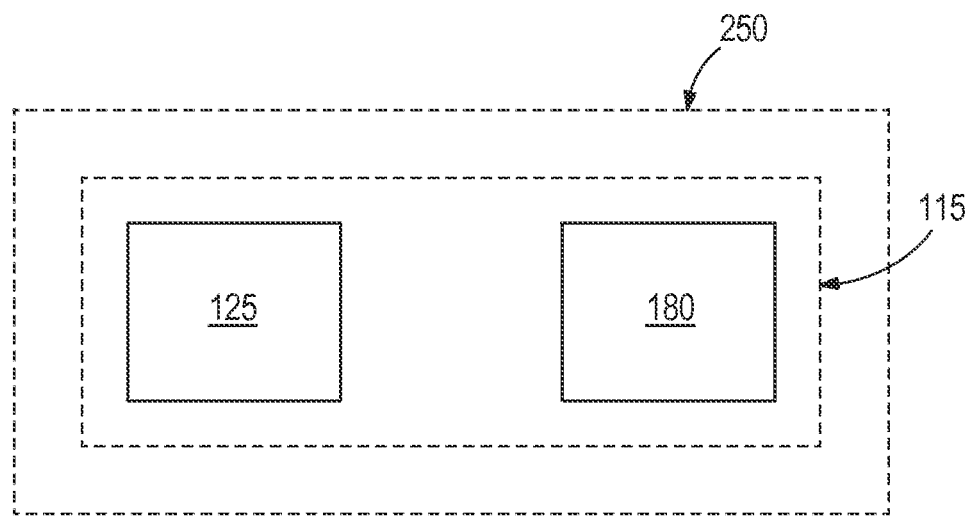
FIG. 4 is a schematic illustration of a kit that includes one or more components of the liner system.

The liner system 115 described above may be used on new shovels 10 (or other new machines or components), and may also be used to retrofit existing machines or components. In some constructions, and as illustrated in FIG. 4, the liner system 115, or just the guide members 125 or inserts 180 themselves, may be provided as a kit 250. The kit 250 may be used to retrofit an existing machine or to provide a replacement guide member 125 or insert 180 for a machine.

Although the invention has been described in detail with reference to certain preferred embodiments, variations and modifications exist within the scope and spirit of one or more independent aspects of the invention as described.

The invention claimed is:

1. A liner system comprising:
a first guide member and a second, separate guide member both sized and shaped to be coupled individually and separately to a surface of a mining machine, wherein the first and second guide members and the surface of the mining machine are configured to define a single channel extending along the mining machine between the first guide member and the second guide member, and wherein the liner system further includes an insert configured to be disposed at least partially within the channel that is inhibited from moving away from the surface of the mining machine by a portion of the first guide member,
wherein the insert has a first surface, a second surface disposed opposite the first surface, a third surface extending between the first and second surfaces, and a fourth surface extending between the first and second surfaces, wherein the first surface has a width that is smaller than a width of the second surface, and also smaller than a width of the channel, and wherein a height between the first surface and the second surface is greater than heights of both the first and second guide members, wherein the guide members are each metallic and each have a trapezoidal cross-sectional shape, and wherein the insert is non-metallic and has a trapezoidal cross-sectional shape.

2. The liner system of claim 1, further comprising the mining machine, wherein the mining machine is a dipper of a mining shovel, wherein the first and second guide members are welded to the surface of the dipper, and the insert is removable from the channel.

3. The liner system of claim 1, wherein the width of the first surface is measured along a direction that extends directly between the first and second guide members, wherein the insert has a thickness measured along a longitudinal direction that extends parallel to directions of elongate extension of the first and second guide members and perpendicular to the width direction, wherein the thickness is less than the width of the first surface.

4. The liner system of claim 1, wherein each of the first and second guide members has an end, and the ends of the first and second guide members define an access opening for insertion of the insert into the channel.

5. The liner system of claim 1, wherein a portion of the insert is configured to be exposed outside of the channel.

6. The liner system of claim 1, wherein the third and fourth surfaces are tapered at angles relative to the first surface such that the third and fourth surfaces diverge away from the first surface.

7. The liner system of claim 2, wherein each of the first and second guide members has a first surface, a second surface disposed opposite the first surface, a third surface extending between the first and second surfaces, and a fourth surface extending between the first and second surfaces, wherein the first surfaces of both the first and second guide members extend generally parallel to the surface of the dipper, as well as to the second surfaces of the first and second guide members, and wherein the first surfaces of the first and second guide members have widths greater than widths of the second surfaces of the first and second guide members, and wherein the second surfaces of the first and second guide members are coupled to the surface of the dipper.

8. The liner system of claim 7, wherein the third surface of the insert is angled relative to the surface of the machine at an angle equal to that of the fourth surface of the first guide member, such that the third surface of the insert extends parallel to the fourth surface of the first guide member.

9. The liner system of claim 8, wherein the fourth surface of the first guide member is configured to inhibit the insert from moving away from the surface of the dipper.

10. The liner system of claim 1, further comprising the mining machine, wherein the mining machine is a dipper of a mining shovel, wherein the guide members are integrally formed with the dipper.

11. The liner system of claim 1, further comprising the mining machine, wherein the mining machine is a dipper of a mining shovel, wherein the liner system includes a plurality of guide members, a plurality of channels defined by the guide members, and a plurality of inserts disposed at least partially within the channels.

12. The liner system of claim 11, wherein the plurality of inserts are arranged in parallel rows along the surface of the dipper.

13. The liner system of claim 1, further comprising the mining machine, wherein the first guide member and the second, separate guide member are coupled individually and separately to the surface of a mining machine, and wherein the surface is curved.

14. A method of assembling a liner system to a dipper of a mining machine, the method comprising:
coupling both a first metallic, trapezoidal-shaped guide member and a second metallic guide member to an inner surface of the dipper, wherein the inner surface faces an interior of the dipper that receives material during a digging operation, wherein the first and second guide members and the inner surface of the dipper define a channel along the dipper; and
sliding a plurality of non-metallic, trapezoidal-shaped inserts between the first and second guide members along a same direction, such that the inserts are at least partially disposed within the channel and are inhibited from moving away from the surface of the dipper by surfaces of the first guide member and the second guide member that define the channel.

15. The method of claim 14, wherein the step of coupling the first and second guide members includes welding the first and second guide members to the inner surface of the dipper.

16. The method of claim 14, wherein the step of inserting the insert includes sliding the insert through an access opening defined by ends of the first and second guide members.

17. The method of claim 14, wherein a portion of the insert is disposed outside of the channel during the step of sliding the insert.

18. The method of claim 14, further comprising sliding a second insert between the first and second guide members, such that the second insert is at least partially disposed within the channel.

19. The method of claim 14, further comprising coupling a third guide member to the surface of the dipper, wherein the second and the third guide members and the surface of the dipper define a second channel along the dipper, and further comprising sliding a second insert between the second and third guide members, such that the second insert is at least partially disposed within the second channel.

20. The method of claim 14, wherein the inner surface is a curved surface.

* * * * *